United States Patent
Rights et al.

(10) Patent No.: US 10,558,492 B2
(45) Date of Patent: Feb. 11, 2020

(54) SYSTEM AND METHOD FOR PREDICTING THE PERFORMANCE OF A RADAR

(71) Applicant: RAYTHEON COMPANY, Waltham, MA (US)

(72) Inventors: Jeffrey A. Rights, Lantana, TX (US); Zhen-Qi Gan, Carrollton, TX (US); Darwin H. Easter, Rowlett, TX (US); Ryan P. Ropp, Baltimore, MD (US); Matthew A. Bennett, Plano, TX (US); John M. Bartlett, Richardson, TX (US)

(73) Assignee: Raytheon Company, Waltham, MA (US)

( * ) Notice: Subject to any disclaimer, the term of this patent is extended or adjusted under 35 U.S.C. 154(b) by 502 days.

(21) Appl. No.: 15/289,040

(22) Filed: Oct. 7, 2016

(65) Prior Publication Data

US 2018/0165121 A1    Jun. 14, 2018

(51) Int. Cl.
*G06F 9/48* (2006.01)
*G01S 7/04* (2006.01)
*G01S 13/90* (2006.01)

(52) U.S. Cl.
CPC .............. *G06F 9/4881* (2013.01); *G01S 7/04* (2013.01); *G01S 13/90* (2013.01)

(58) Field of Classification Search
CPC .......... G06F 9/4881; G01S 13/88; G01S 7/04; G01S 2013/0272; G01S 13/90; G05D 1/0094
USPC ........................................................ 342/175
See application file for complete search history.

(56) References Cited

U.S. PATENT DOCUMENTS

| 7,420,504 B1 | 9/2008 | Held et al. |
| 7,444,638 B1 | 10/2008 | Xu |
| 7,451,447 B1 * | 11/2008 | Deshpande ........... G06F 9/4812 718/102 |

(Continued)

FOREIGN PATENT DOCUMENTS

| EP | 1 615 046 A1 | 1/2006 |
| EP | 3 043 226 A1 | 7/2016 |

OTHER PUBLICATIONS

International Search Report issued in corresponding International Patent Application No. PCT/US2017/044454, filed Jul. 28, 2017, International Search Report dated Jan. 25, 2018 (7 pgs.).

(Continued)

*Primary Examiner* — Frank J McGue
(74) *Attorney, Agent, or Firm* — Lewis Roca Rothgerber Christie LLP

(57) ABSTRACT

A system and method for planning radar missions. The system includes a processing unit and a display. The method includes estimating the execution time of a plurality of radar tasks to be executed periodically at respective planned repetition rates, and assessing, using rate monotonic scheduling, whether the tasks can be executed at their respective planned repetition rates. The display may be employed to display a graphical representation of a path to be flown repeatedly by the aircraft, and, superimposed on the displayed path, symbols indicating whether at any point on the path the radar will be able to execute each task at its respective planned repetition rate, and whether each of a plurality of areas to be surveyed by the radar, each corresponding to a respective radar task, is in the field of view pattern of the radar.

18 Claims, 5 Drawing Sheets

(56) References Cited

U.S. PATENT DOCUMENTS

| | | | |
|---|---|---|---|
| 8,621,473 B2 | 12/2013 | Miller et al. | |
| 2005/0216182 A1 | 9/2005 | Hussain et al. | |
| 2008/0120620 A1* | 5/2008 | Lett | G06F 9/485 |
| | | | 718/103 |
| 2013/0159477 A1* | 6/2013 | Danielsson | G06F 9/5066 |
| | | | 709/220 |

OTHER PUBLICATIONS

Written Opinion issued in corresponding International Patent Application No. PCT/US2017/044454, filed Jul. 28, 2017, Written Opinion dated Jan. 25, 2018 (9 pgs.).

Lehoczky, et al., "The Rate Monotonic Scheduling Algorithm: Exact Characterization and Average Case Behavior", IEEE Comp. Soc. Press, vol. SYMP. 10, Dec. 5, 1989 (pp. 166-171).

Invitation to Pay Additional Fees and, Where Applicable, Protest Fee issued in corresponding International Patent Application No. PCT/US2017/044454, filed Jul. 28, 2017, Invitation to Pay Additional Fees dated Oct. 26, 2017 (10 pgs.).

\* cited by examiner

SYSTEM AND METHOD FOR PREDICTING THE PERFORMANCE OF A RADAR

BACKGROUND

1. Field

One or more aspects of embodiments according to the present invention relate to radar systems and more particularly to mission planning for radar systems.

2. Description of Related Art

When radar missions are flown, a mission plan may be created beforehand, that includes a list of radar tasks to be completed during the mission. A mission planner creating such a mission plan may wish to select a set of tasks that are capable of being completed by the radar system within the time available for the mission.

The time required by a radar task may depend on factors that may vary during the mission, such as the maximum range to an area being surveyed, and the angle between the centerline or boresight of the radar antenna and the direction to the area. Moreover, several tasks may be performed essentially concurrently by the radar, which may return periodically to any particular area being surveyed. As such the tasks may interact in that they may compete for operating time on the radar. Predicting whether a given set of tasks can be completed is therefore potentially complex, and thus there is a need for a system and method for performing such predictions.

SUMMARY

Aspects of embodiments of the present disclosure are directed toward a system and method for planning radar missions. The system includes a processing unit and a display. The method includes estimating the execution time of a plurality of radar tasks to be executed periodically at respective planned repetition rates, and assessing, using rate monotonic scheduling, whether the tasks can be executed at their respective planned repetition rates. The display may be employed to display a graphical representation of a path to be flown repeatedly by the aircraft, and, superimposed on the displayed path, symbols indicating whether at any point on the path the radar will be able to execute each task at its respective planned repetition rate, and whether each of a plurality of areas to be surveyed by the radar, each corresponding to a respective radar task, is in the field of view pattern of the radar. Some embodiments of this method of mission planning support rapid what-if analysis/simulation on the ground before a mission is flown.

According to an embodiment of the present invention there is provided a method for radar mission planning for surveying a region with a radar mounted on an aircraft, the method including: for a first point on a path to be flown repeatedly by the aircraft: generating a first estimated execution time for each of a plurality of periodic radar tasks, each of the plurality of periodic radar tasks having a planned repetition rate; generating a first schedule for the plurality of periodic radar tasks, and employing the first schedule to determine whether the radar is capable of executing each of the plurality of periodic radar tasks at its respective planned repetition rate.

In one embodiment, the generating of a first schedule includes generating the first schedule using rate monotonic scheduling, and wherein the method further includes, for a second point on the path: generating a second estimated execution time for each of the plurality of periodic radar tasks, when the second estimated execution time of any periodic radar task of the plurality of periodic radar tasks differs from the first estimated execution time for the periodic radar task by more than a threshold execution time difference: generating a second schedule for the plurality of periodic radar tasks using rate monotonic scheduling, and employing the second schedule to determine whether the radar is capable of executing each of the plurality of periodic radar tasks at its respective planned repetition rate, and when the second estimated execution time of each periodic radar task of the plurality of periodic radar tasks differs from the first estimated execution time for the periodic radar task by less than the threshold execution time difference: employing the first schedule to determine whether the radar is capable of executing each of the plurality of periodic radar tasks at its respective planned repetition rate.

In one embodiment, for each periodic radar task of the plurality of periodic radar tasks the threshold execution time difference is 10% of the first estimated execution time of the periodic radar task.

In one embodiment, the method includes displaying a graphical symbol associated with the first point, the graphical symbol having a first indicator part, the first indicator part having: a first status when in the first schedule, each periodic radar task of the plurality of periodic radar tasks is executed at its planned repetition rate, a second status when in the first schedule, each periodic radar task of the plurality of periodic radar tasks is executed at its planned repetition rate or at a repetition rate lower than its planned repetition rate, and a third status when in the first schedule, a periodic radar task of the plurality of periodic radar tasks is not executed.

In one embodiment, the method includes displaying the path to be flown repeatedly by the aircraft, and wherein the displaying of the graphical symbol includes displaying the graphical symbol on the displayed path to be flown at a point corresponding to the first point.

In one embodiment, the method includes: for a third point on the path to be flown repeatedly by the aircraft, determining for each of a plurality of areas to be surveyed by the radar the extent to which it is within a field of view pattern of the radar, and displaying a graphical symbol, for the point on the path, the symbol having a second indicator part, the second indicator part having: a first status when each of the areas to be surveyed is within the field of view pattern to an extent exceeding a first threshold, a second status when: each of the areas to be surveyed is within the field of view pattern to an extent exceeding a second threshold lower than the first threshold, and at least one of the areas to be surveyed is not within the field of view pattern to an extent exceeding the first threshold, and a third status when at least one of the areas to be surveyed is not within the field of view pattern to an extent exceeding the second threshold.

In one embodiment, the first threshold is 80% and the second threshold is 20%.

In one embodiment, the generating of the first estimated execution time for a periodic radar task of the plurality of radar periodic radar tasks includes: calculating a maximum range for each of a plurality of shapes to cover an area to be surveyed by the radar, the area to be surveyed corresponding to the periodic radar task, each of the plurality of shapes being defined by a cluster of radar beams, calculating a dwell time for each of a plurality of shapes, as a function of the maximum range and of a specified signal to noise ratio, and summing the dwell times.

In one embodiment, the area to be surveyed has the shape of a polygon and wherein the calculating of a maximum range for a shape of the plurality of shapes includes: for each beam in the cluster of beams defining the shape: for each corner of the polygon: calculating the location of an intersection between: a line passing through the corner and an adjacent corner, and a radial line in the direction of the beam, and adding the distance of the point of intersection to a list of candidate maximum ranges when the point of intersection is on the polygon, and taking the maximum value from the list of candidate maximum ranges.

In one embodiment, the method includes: operating an aircraft to fly the path repeatedly, and operating an aircraft-mounted radar to repeatedly execute each of each of the plurality of periodic radar tasks.

According to an embodiment of the present invention there is provided a system for radar mission planning for surveying a region with a radar mounted on an aircraft, the system including a processing unit configured to: for a first point on a path to be flown repeatedly by the aircraft: generate a first estimated execution time for each of a plurality of periodic radar tasks, each of the plurality of periodic radar tasks having a planned repetition rate; generate a first schedule for the plurality of periodic radar tasks using rate monotonic scheduling, and employ the first schedule to determine whether the radar is capable of executing each of the plurality of periodic radar tasks at its respective planned repetition rate, and for a second point on the path: generate a second estimated execution time for each of the plurality of periodic radar tasks, when the second estimated execution time of any periodic radar task of the plurality of periodic radar tasks differs from the first estimated execution time for the periodic radar task by more than a threshold execution time difference: generate a second schedule for the plurality of periodic radar tasks using rate monotonic scheduling, and employ the second schedule to determine whether the radar is capable of executing each of the plurality of periodic radar tasks at its respective planned repetition rate, and when the second estimated execution time of each periodic radar task of the plurality of periodic radar tasks differs from the first estimated execution time for the periodic radar task by less than the threshold execution time difference: employ the first schedule to determine whether the radar is capable of executing each of the plurality of periodic radar tasks at its respective planned repetition rate.

In one embodiment, for each periodic radar task, of the plurality of periodic radar tasks the threshold execution time difference is 10% of the first estimated execution time of the periodic radar task.

In one embodiment, the system includes a display, wherein the processing unit is further configured to display, on the display, a graphical symbol associated with the first point, the graphical symbol having a first indicator part, the first indicator part having: a first status when in the first schedule, each periodic radar task of the plurality of periodic radar tasks is executed at its planned repetition rate, a second status when in the first schedule, each periodic radar task of the plurality of periodic radar tasks is executed at its planned repetition rate or at a repetition rate lower than its planned repetition rate, and a third status when in the first schedule, a periodic radar task of the plurality of periodic radar tasks is not executed.

In one embodiment, the processing unit is further configured to display the path to be flown repeatedly by the aircraft, and wherein the displaying of the graphical symbol includes displaying the graphical symbol on the displayed path to be flown at a point on the display corresponding to the first point.

In one embodiment, the processing unit is further configured to: for a point on the path to be flown repeatedly by the aircraft, determine for each of a plurality of areas to be surveyed by the radar the extent to which it is within a field of view pattern of the radar, and display a graphical two-part symbol, for the point on the path, the symbol having a second indicator part, the second indicator part having: a first status when each of the areas to be surveyed is within the field of view pattern to an extent exceeding a first threshold, a second status when: each of the areas to be surveyed is within the field of view pattern to an extent exceeding a second threshold lower than the first threshold, and at least one of the areas to be surveyed is not within the field of view pattern to an extent exceeding the first threshold, and a third status when at least one of the areas to be surveyed is not within the field of view pattern to an extent exceeding the second threshold.

In one embodiment, the first threshold is 80% and the second threshold is 20%.

In one embodiment, the generating of the first estimated execution time for a periodic radar task of the plurality of radar periodic radar tasks includes: calculating a maximum range for each of a plurality of trapezoids to cover an area to be surveyed by the radar, the area to be surveyed corresponding to the periodic radar task, each of the plurality of trapezoids being defined by a cluster of radar beams, and calculating a dwell time for each of a plurality of trapezoids, as a function of the maximum range and of a specified signal to noise ratio, and summing the dwell times.

In one embodiment, the area to be surveyed has the shape of a polygon and wherein the calculating of a maximum range for a trapezoid of the plurality of trapezoids includes: for each beam in the cluster of beams defining the trapezoid: for each corner of the polygon: calculating the location of an intersection between: a line passing through the corner and an adjacent corner, and a radial line in the direction of the beam, and adding the distance of the point of intersection to a list of candidate maximum ranges when the point of intersection is on the polygon, and taking the maximum value from the list of candidate maximum ranges.

According to an embodiment of the present invention there is provided a method for radar mission planning for surveying a region with a radar mounted on an aircraft, the method including: for a first point on a path to be flown repeatedly by the aircraft, determining for each of a plurality of areas to be surveyed by the radar the extent to which it is within a field of view pattern of the radar, and displaying a graphical symbol, for the point on the path, the symbol having a indicator part, the indicator part having: a first status when each of the areas to be surveyed is within the field of view pattern to an extent exceeding a first threshold, a second status when: each of the areas to be surveyed is within the field of view pattern to an extent exceeding a second threshold lower than the first threshold, and at least one of the areas to be surveyed is not within the field of view pattern to an extent exceeding the first threshold, and a third status when at least one of the areas to be surveyed is not within the field of view pattern to an extent exceeding the second threshold.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for predicting the performance of a radar provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In one embodiment an airborne radar system may fly a mission, which may include repeatedly flying around an "orbit", e.g., a closed path to be flown repeatedly by the aircraft, and performing radar surveillance while flying. During each orbit, the radar system may complete a number of tasks. Each task may consist of surveying a respective area to be surveyed by the radar, or "ground-reference coverage area" in a respective mode of operation. For example, the radar may illuminate a first ground-reference coverage area periodically, e.g., once every 10 seconds, to detect moving targets in a ground-reference coverage area marine moving target indicator (MMTI), or in a ground-reference coverage area ground moving target indicator (GMTI) mode of operation. In such a mode, the radar beam may be aimed at the first ground-reference coverage area every 10 seconds, and each time it may continue to illuminate the ground-reference coverage area, for a period of time referred to as an execution time. In other modes of operation, such as spot synthetic aperture radar (SAR), the beam may illuminate the ground-reference coverage area only once during the mission, again dwelling on the ground-reference coverage area for a respective execution time appropriate for obtaining the desired data.

It may be helpful to a mission planner to know, for every point on an orbit that an aircraft may fly, which ground-reference coverage areas are within the field of view pattern of the radar. It may also be helpful to the mission planner to know, for example, for each of a plurality of discrete points along the orbit, whether it is feasible to complete each of the planned tasks given the time required to complete each iteration of each task (the "execution time" of the task) and the frequency, or "planned repetition rate" with which each task is to be performed.

Figure 1:
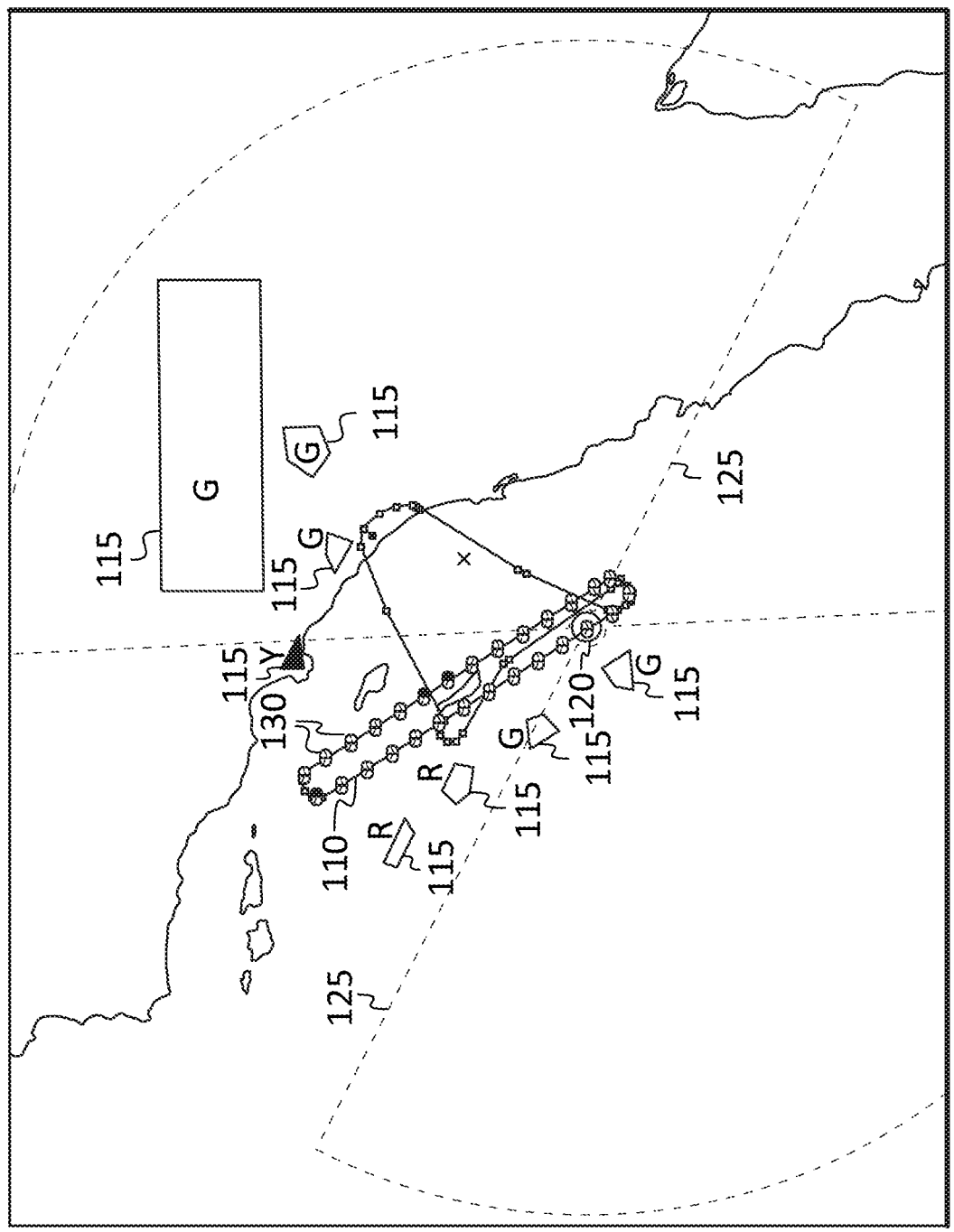
FIG. 1 is an illustration of a displayed geographic region showing an aircraft orbit and radar performance indicators, according to an embodiment of the present invention.

Referring to FIG. 1, in one embodiment a planning tool may use a graphical display to present to the mission planner a radar performance diagram illustrating various such aspects of the performance of the radar during a mission. Each task corresponds to a ground-reference coverage area 115 to be surveyed. During the mission, the aircraft may fly repeated loops around a repeating flight path referred to as an "orbit" 110, which may be a racetrack shape, having two straightaways and two curves, as illustrated. The ground-reference coverage area 115 corresponding to each task may be drawn on a map that may also show the orbit 110, the current location 120 of the aircraft (at a point in time during the simulation), and the field of view pattern of the radar, which may consist of two lobes 125, each having a certain angular extent (e.g., corresponding to the field of view of a respective antenna, such as a phased array antenna) and a certain range. At fixed intervals along the orbit 110 (corresponding, for example, to 5 minutes' flying time), the radar performance diagram may include status indicators, or "pills" 130. Each status indicator 130 may consist of two parts, each having a status representing an aspect of the status of the system. For example, each status indicator 130 may consist of two halves each filled with a color, and the status of each of these halves may be the color with which the half of the status indicator is filled. In one embodiment, either half of the status indicator may have either a first status (in which it is filled with a first color, e.g., green), a second status (in which it is filled with a second color, e.g., yellow), or a third status (in which it is filled with a third color, e.g., red). The left half of each status indicator 130 may show the timeline status of the radar, i.e., the extent to which the radar is able to complete all of the planned tasks.

The right half of each status indicator 130 may indicate the extent to which, when the aircraft is at the position of the status indicator 130, all of the ground-reference coverage areas 115 are within the field of view pattern. It may have a first status (e.g., it may be colored green) if at least 80% of each of the ground-reference coverage areas is within the field of view pattern, it may have a third status (e.g., it may be colored red) if there is at least one ground-reference coverage area of which less than 20% is in the field of view pattern, and it may have a second status (e.g., it may be colored yellow) otherwise, i.e., if all of the ground-reference coverage areas are more than 20% in the field of view pattern, but there is at least one ground-reference coverage area of which less than 80% is in the field of view pattern.

Each of the ground-reference coverage areas 115 corresponding to the tasks may also have a status (e.g., be filled with a color) to show its field of view status at the current location of the aircraft, e.g., it may be green (labelled "G" in FIG. 1) if the ground-reference coverage area 115 is at least 80% within the field of view pattern of the radar, yellow (labelled "Y" in FIG. 1) if more than 20% and less than 80% of the ground-reference coverage area 115 is within the field of view pattern of the radar, and it may be red (labelled "R" in FIG. 1) if less than 20% of the ground-reference coverage area 115 is within the field of view pattern of the radar. These indicators may help a mission planner to select tasks, an orbit, and an orbit duration that best achieves the completion of a useful set of tasks. Whether a ground-reference coverage area 115 is within the field of view pattern at any point on the orbit may be determined by numerically calculating the overlap between the lobes 125 and the ground-reference coverage area 115.

The planning tool may, for each of a plurality of points on the orbit 110, generate a schedule of radar tasks. The planning tool may then give the left half of each status indicator 130 a status (e.g., it may fill the left half of each status indicator 130 with a color) representing the extent to which the scheduling succeeded. The left half of a status indicator 130 corresponding to one of these points may have a first status (e.g., it may be green) if, in the schedule, each task is executed at its planned repetition rate, a second status (e.g., yellow) if, in the schedule, each task is executed at its planned repetition rate or at a repetition rate lower than its planned repetition rate, and a third status (e.g., red) if, in the schedule, a task is not executed.

Determining whether the radar is able, at any point in the orbit, to complete all of the planned tasks may involve estimating the time required for each iteration of each task, and scheduling the tasks according to their respective periodicity. The periodicity may be the reciprocal of the planned repetition rate at which the task is planned to execute repeatedly. Referring to Table 1, in one embodiment a mission planner may create a task table listing a set of tasks to be completed during the mission, each task having a task identifier (e.g., "E8873"), a type, such as spot synthetic aperture radar (SAR), area marine moving target indicator (MMTI), or area ground moving target indicator (GMTI), a priority, and a periodicity. The priority may be used by the system to determine which tasks should be allowed to not execute at the requested periodicity if system resources are insufficient for all the tasks. The operator may choose to use priority numbers that are not consecutive (e.g., the priority of each task differing from the priority of other tasks by 40 or more, as in the example of Table 1) to facilitate the addition, if desired, of a task of intermediate priority between two tasks already in the table.

TABLE 1

| Task  | Type      | Priority | Periodicity (seconds) |
|-------|-----------|----------|-----------------------|
| E8773 | Spot SAR  | 1000     | N/A                   |
| DFED4 | AREA MMTI | 400      | 8                     |
| C0F44 | AREA GMTI | 350      | 20                    |
| 3B68f | AREA GMTI | 300      | 5                     |
| E18C2 | AREA GMTI | 250      | 15                    |
| 821d0 | AREA GMTI | 210      | 12                    |
| FE573 | AREA MMTI | 0        | 22                    |
| 5308d | AREA GMTI | 150      | 30                    |
| 36924 | AREA GMTI | 100      | 20                    |
| 7783e | Spot SAR  | 1100     | N/A                   |

The ability of the radar to execute all of the tasks may depend on the position of the aircraft in the orbit 110 for several reasons. For example, the radar may not spend time on any tasks for ground-reference coverage areas 115 that are not in the current field of view pattern of the radar (which varies depending on the location and heading of the aircraft), or the radar may need to spend more time on tasks for ground-reference coverage areas 115 that are more distant, or that are near the edge of, but within, the field of view pattern, because the signal to noise ratio may be reduced in either case.

At any point in the orbit, a scheduler may be used to predict which tasks the radar will be capable of completing on schedule. In one embodiment the scheduler uses an algorithm that relies on rate monotonic scheduling. Rate monotonic scheduling is a scheduling algorithm that may be used to schedule a number of periodic tasks, when the task parameters (e.g., the priority, periodicity, and execution time of each task) are constant. In the case of a radar system, however, the task execution time may change as the signal to noise ratio changes, because, for example, a longer dwell may be used when the signal to noise ratio decreases. The signal to noise ratio may depend (as mentioned above) on the range and on whether the ground-reference coverage area is near the edge of the field of view pattern of the radar; as these parameters change for a task, the corresponding task execution time may change. In some embodiments other scheduling algorithms may be used instead of rate monotonic scheduling. For example, a Least Slack Time Algorithm may be used.

For example, at a point on the orbit, an execution time model, described in further detail below, may be used to predict the execution time, i.e., the amount of time the radar will spend, for each iteration of the task. An "active set" of tasks may then be defined to include a set of guaranteed tasks, and the two highest priority tasks in the task table that are not guaranteed tasks, or "non-guaranteed" tasks. The guaranteed tasks may be the largest set of tasks that satisfy a schedulability test, and for which no task not in the set has a higher priority than any task in the set. The schedulability test may be one derived for rate monotonic scheduling:

$$U = \sum_{i=1}^{n} \frac{C_i}{T_i} \le n(2^{1/n} - 1)$$

where $C_i$ is the execution time of the task, $T_i$ is the task period (with deadline one period later), and n is the number of tasks to be scheduled. To identify the set of guaranteed tasks, the planning tool may add tasks from the task list in order of decreasing priority, until the utilization of the radar increases past the value U calculated according to the equation above.

Figure 2:
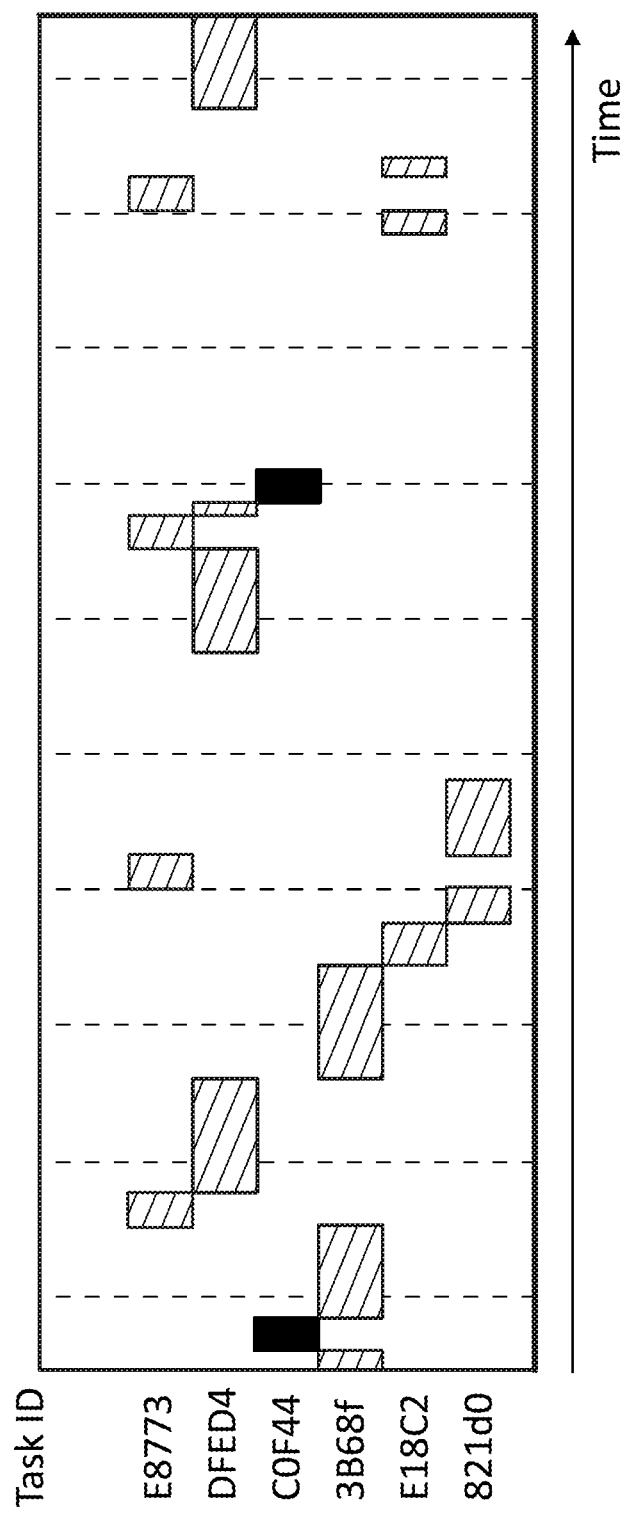
FIG. 2 is a task timeline of radar tasks, according to an embodiment of the present invention.

After identifying the guaranteed set of tasks, and adding two tasks (as mentioned above) to form the active set of tasks, the planning tool may then run a rate monotonic scheduler to assess which, if any, of the non-guaranteed are able to run. The schedule generated by the rate monotonic scheduler may be illustrated in a task timeline or "energy laydown diagram" as shown, for example, in FIG. 2. This diagram illustrates the order in which the tasks run. Whether all of the tasks in the active set of tasks are able to run may determine whether a status indicator 130, at a point on the orbit being simulated, is displayed with a left half that has a first, second, or third status (e.g., that is red, yellow, or green).

In some embodiments, when the rate monotonic scheduler is able to schedule all of the tasks, the planning tool uses a policy referred to as a "fairness" policy to allow additional tasks in the task table, that are not part of the active set of tasks, to run. The fairness policy may be designed, for example, to allow an additional task to run, but to not allow it to use the radar, during each period of the task, for more time than the time required to complete one iteration of the task. For example, if an additional task has a periodicity of 60 seconds and each iteration requires 10 seconds to complete, the fairness policy may allow it to use at most 10 seconds of radar time during any 60 second interval.

In one embodiment, the scheduler employs rate monotonic scheduling to schedule the tasks at any given point in time, and monitors the execution time of each task as the simulation proceeds. If the execution time of any task changes by more than a threshold amount, the scheduler reschedules the tasks, using updated execution tasks, again using rate monotonic scheduling. The respective threshold for each task may be a set fraction (e.g., 5%, 10%, or 20%) of the execution time of the task, or it may be a set fraction (e.g., 5%, 10%, or 20%) of the total time available.

Figure 3:
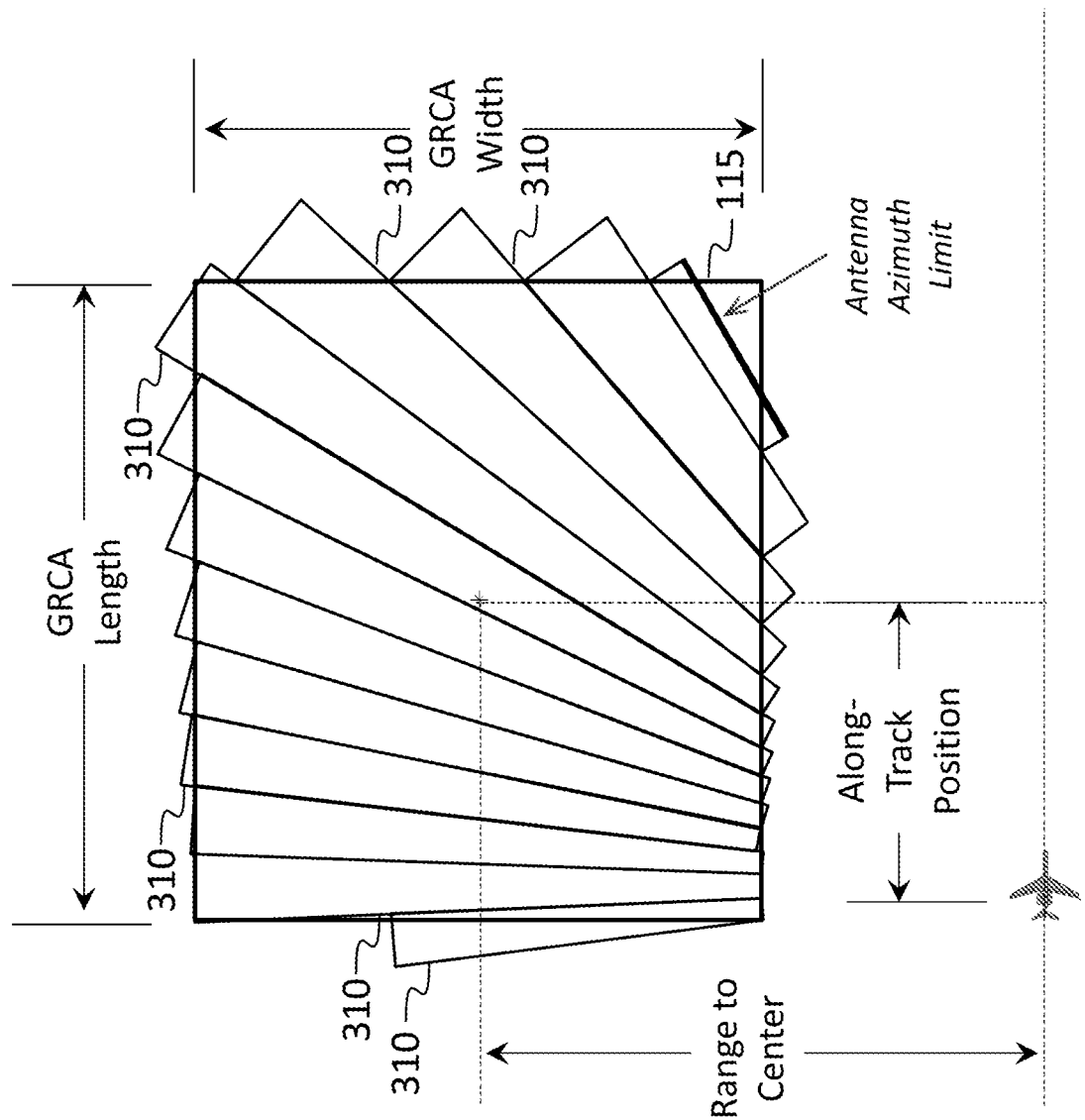
FIG. 3 is an illustration of plurality of trapezoids covering a ground-reference coverage area, according to an embodiment of the present invention.

The execution time model may use simplifying approximations to improve the performance of the planning tool, so that a mission planner may quickly assess the merits of various alternatives. Referring to FIG. 3, if one of the ground-reference coverage areas 115 is a rectangle as shown, the model may generate a set of trapezoids 310 that cover the ground-reference coverage area 115 as well as possible. The model may treat the local surface of the earth as being planar (i.e., it may ignore the curvature of the earth and any local topography) and it may model the aircraft as flying in that plane (i.e., it may ignore the altitude of the aircraft above the surface of the earth). The radar may dwell in each trapezoid 310 during a dwell time selected to achieve a sufficient signal to noise ratio; the sum of the dwell times is the execution time generated by the model. Each trapezoid 310 may correspond to a cluster of beams simultaneously transmitted by the antenna.

The trapezoids 310 may be selected to extend in azimuth to cover the range of azimuth angles the ground-reference coverage area subtends, or to extend to the forward or rearward antenna azimuth limit, whichever is smaller. Each trapezoid 310 may extend in range as far the most distant range point in the ground-reference coverage area 115 that the trapezoid 310 may reach, and as near as the nearest range point the trapezoid 310 may reach. In the example of FIG. 3, in which the ground-reference coverage area 115 is a rectangle, each beam may intersect two edges of the ground-reference coverage area 115, a near edge and a far edge. If the ground-reference coverage area 115 is defined as the region within an arbitrary polygon (that need not be convex) then each beam may intersect more than two edges.

To determine the maximum and minimum range for a beam, the model proceeds as follows. The corners of the polygon are numbered in order around the perimeter of the polygon. For each corner, the model determines the location of the point of intersection between a line (i.e., an infinite-length line) drawn between the corner and the next corner (i.e., the corner with the next higher number, or the first corner if the current corner is the last corner) and a radial line in the direction of the beam. If the point of intersection falls between the two corners, then it is a point on the boundary of the ground-reference coverage area that the beam illuminates (otherwise, the point of intersection is not relevant, and is disregarded). All such points are found (by iterating over all of the corners) and the point nearest the aircraft and the point farthest from the aircraft are identified as the point of minimum and maximum range, respectively, for the beam. The minimum and maximum ranges of the beam then become candidates for the minimum and maximum ranges of the trapezoid 310 (i.e., of the cluster of beams). This process is repeated for all of the beams in the cluster, and the maximum value of the respective maxima (i.e., the largest value of the candidate maximum ranges) is taken as the maximum range for the cluster (and for the corresponding trapezoid 310), and the minimum value of the respective beam minima (i.e., the smallest value of the candidate minimum ranges) is taken as the minimum range for the cluster.

The width of the trapezoids 310 may vary with the azimuth angle of the beam, because, for example, if the radar employs a substantially straight or planar phased array antenna, the effective width of the antenna may vary as the cosine of the angle between the beam and the boresight of (i.e., a line perpendicular to the plane of) the antenna. Accordingly, the centerlines of the trapezoid 310, instead of being spaced evenly in angle, may be spaced so that the sines of the respective angles are spaced evenly over a range of values, (e.g., evenly spaced over the range −0.707 to +0.707 for angles ranging from −45 degrees to +45 degrees).

Figure 4:
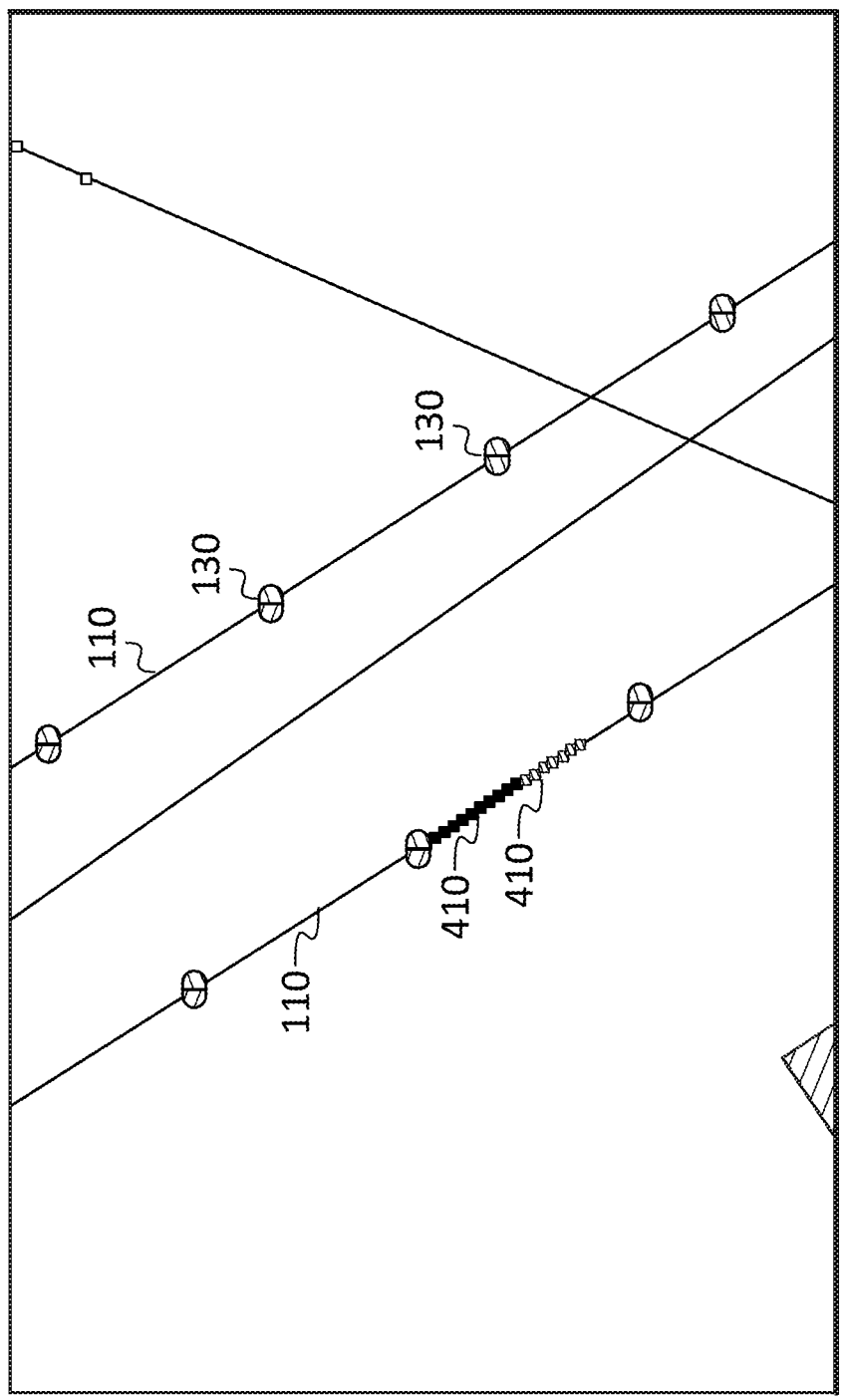
FIG. 4 is an enlarged illustration of a displayed geographic region showing a portion of an aircraft orbit and radar performance indicators, according to an embodiment of the present invention.

Once the trapezoids 310 are defined for the ground-reference coverage area, the fraction of the ground-reference coverage area 115 that is within the field of view pattern of the radar may be calculated. The model may also calculate the dwell time by calculating, for the maximum range, the dwell time for which acceptable signal to noise will be achieved. In one embodiment, the computational efficiency of the model is improved by assuming that the signal to noise ratio obtained during a given time interval is constant during the dwell time, i.e., it does not change as a result of changes in the aircraft's position during the dwell time Referring to FIG. 4, in one embodiment further detail may be displayed to a mission planner, e.g., circles 410 or other symbols may be displayed along the orbit 110 between adjacent status indicators 130. Each circle 410 may have a status (e.g., a color) indicating the extent to which the ground-reference coverage areas 115 are within the field of view pattern. For example, the circles 410 may have a first status (e.g., green) if at least 80% of each of the ground-reference coverage areas is within the field of view pattern, a third status (e.g., red) if there is at least one ground-reference coverage area of which less than 20% is in the field of view pattern, and a second status (e.g., yellow) otherwise, i.e., if all of the ground-reference coverage areas are more than 20% in the field of view pattern, but there is at least one ground-reference coverage area of which less than 80% is in the field of view pattern.

In another embodiment the status of the right half of each status indicator 130, and each of the circles 410 may instead display a color or status corresponding to the extent to which any GRCA is masked (i.e., obscured from the radar by intervening topography). It may have a first status (e.g., it may be colored green) if at least 80% of each of the ground-reference coverage areas is not masked, it may have a third status (e.g., it may be colored red) if there is at least one ground-reference coverage area of which more than 20% is masked, and it may have a second status (e.g., it may be colored yellow) otherwise, i.e., if all of the ground-reference coverage areas are less than 20% masked, but there is at least one ground-reference coverage area of which more than 80% is masked. In some embodiments the operator may toggle between the two different display modes (corresponding respectively to displaying, in the color or status, (i) the extent to which, when the aircraft is at the position of the status indicator 130, all of the ground-reference coverage areas 115 are within the field of view pattern, or (ii) the extent to which, when the aircraft is at the position of the status indicator 130, the ground-reference coverage areas 115 are masked by intervening topography).

Figure 5:
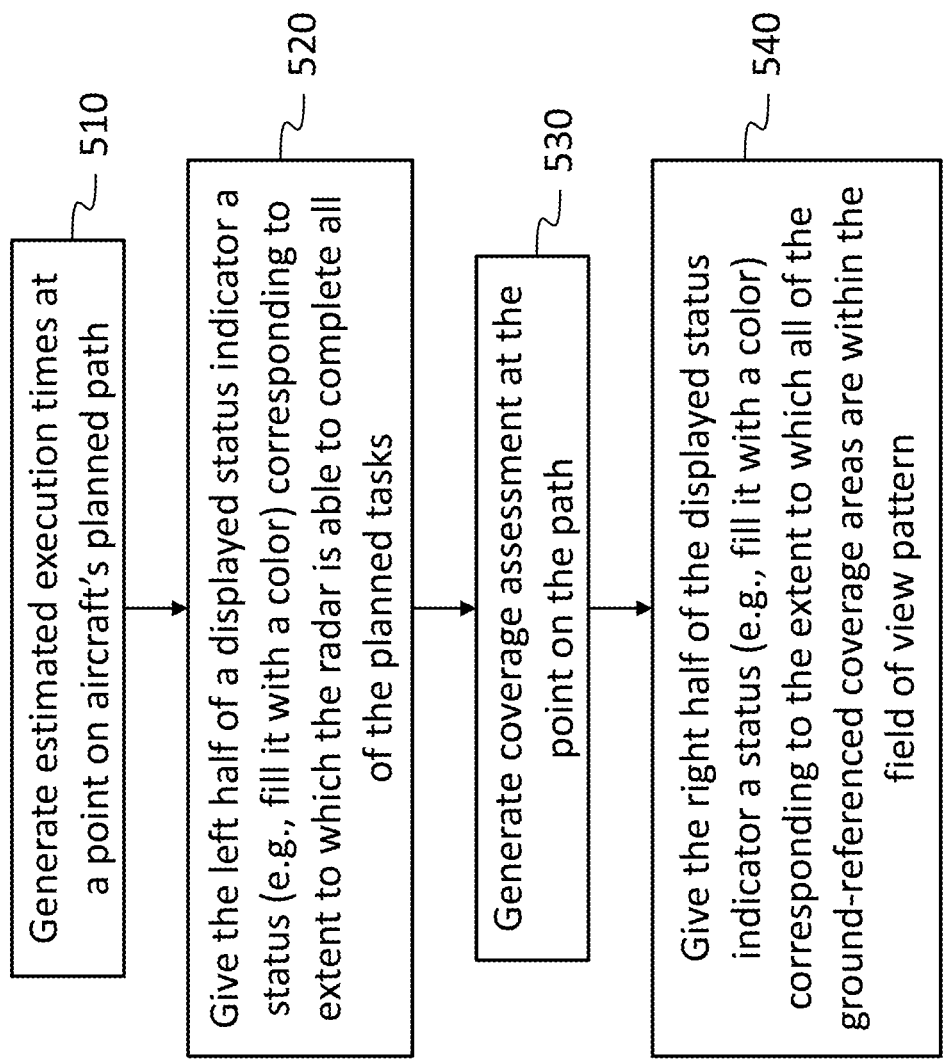
FIG. 5 is a flow chart of a method for displaying radar performance indicators, according to an embodiment of the present invention.

Referring to FIG. 5, in one embodiment, in an act 510, execution times are estimated for each of a plurality of tasks, and, in an act 520, status indicators are displayed, each status indicator having a left half having a status (e.g., being filled with a color) corresponding to extent which the radar is able to complete all of the planned tasks. In an act 530, a coverage assessment is generated, and, in an act 540, the right half of the displayed status indicator is given a status (e.g., filled with a color) corresponding to the extent to which all of the ground-reference coverage areas are within the field of view pattern.

In one embodiment, the planning tool is executed by a processing unit. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB. In some embodiments, a parallel processing computer may be used to assess the performance of the radar system simultaneously for a plurality of time intervals.

Although limited embodiments of a system and method for predicting the performance of a radar have been specifically described and illustrated herein, many modifications and variations will be apparent to those skilled in the art. Accordingly, it is to be understood that the system and method for predicting the performance of a radar employed according to principles of this invention may be embodied other than as specifically described herein. The invention is also defined in the following claims, and equivalents thereof.

What is claimed is:

1. A method for radar mission planning for surveying a region with a radar mounted on an aircraft, the method comprising:
    for a first point on a path to be flown repeatedly by the aircraft:
        generating a first estimated execution time for each of a plurality of periodic radar tasks, each of the plurality of periodic radar tasks having a planned repetition rate;
        generating a first schedule for the plurality of periodic radar tasks, and
        employing the first schedule to determine whether the radar is capable of executing each of the plurality of periodic radar tasks at its respective planned repetition rate; and
    for a second point on the path:
        generating a second estimated execution time for each of the plurality of periodic radar tasks,
        when the second estimated execution time of any periodic radar task of the plurality of periodic radar tasks differs from the first estimated execution time for the periodic radar task by more than a threshold execution time difference:
            generating a second schedule for the plurality of periodic radar tasks using rate monotonic scheduling, and
            employing the second schedule to determine whether the radar is capable of executing each of the plurality of periodic radar tasks at its respective planned repetition rate,
        wherein the generating of a first schedule comprises generating the first schedule using rate monotonic scheduling.

2. The method of claim 1, wherein the method further comprises, for the second point on the path:
    when the second estimated execution time of each periodic radar task of the plurality of periodic radar tasks differs from the first estimated execution time for the periodic radar task by less than the threshold execution time difference:
        employing the first schedule to determine whether the radar is capable of executing each of the plurality of periodic radar tasks at its respective planned repetition rate.

3. The method of claim 2, wherein for each periodic radar task of the plurality of periodic radar tasks the threshold execution time difference is 10% of the first estimated execution time of the periodic radar task.

4. The method of claim 2, further comprising displaying a graphical symbol associated with the first point, the graphical symbol having a first indicator part, the first indicator part having:
    a first status when in the first schedule, each periodic radar task of the plurality of periodic radar tasks is executed at its planned repetition rate,
    a second status when in the first schedule, each periodic radar task of the plurality of periodic radar tasks is executed at its planned repetition rate or at a repetition rate lower than its planned repetition rate, and
    a third status when in the first schedule, a periodic radar task of the plurality of periodic radar tasks is not executed.

5. The method of claim 4, further comprising displaying the path to be flown repeatedly by the aircraft, and wherein the displaying of the graphical symbol comprises displaying the graphical symbol on the displayed path to be flown at a point corresponding to the first point.

6. The method of claim 4, further comprising:
    for a third point on the path to be flown repeatedly by the aircraft, determining for each of a plurality of areas to be surveyed by the radar the extent to which it is within a field of view pattern of the radar, and
    displaying a graphical symbol, for the point on the path, the symbol having a second indicator part, the second indicator part having:
        a first status when each of the areas to be surveyed is within the field of view pattern to an extent exceeding a first threshold,
        a second status when:
            each of the areas to be surveyed is within the field of view pattern to an extent exceeding a second threshold lower than the first threshold, and
            at least one of the areas to be surveyed is not within the field of view pattern to an extent exceeding the first threshold, and
        a third status when at least one of the areas to be surveyed is not within the field of view pattern to an extent exceeding the second threshold.

7. The method of claim 6, wherein the first threshold is 80% and the second threshold is 20%.

8. The method of claim 2, wherein the generating of the first estimated execution time for a periodic radar task of the plurality of radar periodic radar tasks comprises:
    calculating a maximum range for each of a plurality of shapes to cover an area to be surveyed by the radar, the area to be surveyed corresponding to the periodic radar task, each of the plurality of shapes being defined by a cluster of radar beams,
    calculating a dwell time for each of a plurality of shapes, as a function of the maximum range and of a specified signal to noise ratio, and
    summing the dwell times.

9. The method of claim 8, wherein the area to be surveyed has the shape of a polygon and wherein the calculating of a maximum range for a shape of the plurality of shapes comprises:
    for each beam in the cluster of beams defining the shape:

for each corner of the polygon:
  calculating the location of an intersection between:
    a line passing through the corner and an adjacent corner, and
    a radial line in the direction of the beam, and
  adding the distance of the point of intersection to a list of candidate maximum ranges when the point of intersection is on the polygon, and
taking the maximum value from the list of candidate maximum ranges.

10. The method of claim 1, further comprising:
operating an aircraft to fly the path repeatedly, and
operating an aircraft-mounted radar to repeatedly execute each of each of the plurality of periodic radar tasks.

11. A system for radar mission planning for surveying a region with a radar mounted on an aircraft, the system comprising a processing unit configured to:
for a first point on a path to be flown repeatedly by the aircraft:
  generate a first estimated execution time for each of a plurality of periodic radar tasks, each of the plurality of periodic radar tasks having a planned repetition rate;
  generate a first schedule for the plurality of periodic radar tasks using rate monotonic scheduling, and
  employ the first schedule to determine whether the radar is capable of executing each of the plurality of periodic radar tasks at its respective planned repetition rate, and
for a second point on the path:
  generate a second estimated execution time for each of the plurality of periodic radar tasks,
  when the second estimated execution time of any periodic radar task of the plurality of periodic radar tasks differs from the first estimated execution time for the periodic radar task by more than a threshold execution time difference:
    generate a second schedule for the plurality of periodic radar tasks using rate monotonic scheduling, and
    employ the second schedule to determine whether the radar is capable of executing each of the plurality of periodic radar tasks at its respective planned repetition rate, and
  when the second estimated execution time of each periodic radar task of the plurality of periodic radar tasks differs from the first estimated execution time for the periodic radar task by less than the threshold execution time difference:
    employ the first schedule to determine whether the radar is capable of executing each of the plurality of periodic radar tasks at its respective planned repetition rate.

12. The system of claim 11, wherein for each periodic radar task, of the plurality of periodic radar tasks the threshold execution time difference is 10% of the first estimated execution time of the periodic radar task.

13. The system of claim 11, further comprising a display, wherein the processing unit is further configured to display, on the display, a graphical symbol associated with the first point, the graphical symbol having a first indicator part, the first indicator part having:
a first status when in the first schedule, each periodic radar task of the plurality of periodic radar tasks is executed at its planned repetition rate,
a second status when in the first schedule, each periodic radar task of the plurality of periodic radar tasks is executed at its planned repetition rate or at a repetition rate lower than its planned repetition rate, and
a third status when in the first schedule, a periodic radar task of the plurality of periodic radar tasks is not executed.

14. The system of claim 13, wherein the processing unit is further configured to display the path to be flown repeatedly by the aircraft, and wherein the displaying of the graphical symbol comprises displaying the graphical symbol on the displayed path to be flown at a point on the display corresponding to the first point.

15. The system of claim 13, wherein the processing unit is further configured to:
for a point on the path to be flown repeatedly by the aircraft, determine for each of a plurality of areas to be surveyed by the radar the extent to which it is within a field of view pattern of the radar, and
display a graphical two-part symbol, for the point on the path, the symbol having a second indicator part, the second indicator part having:
  a first status when each of the areas to be surveyed is within the field of view pattern to an extent exceeding a first threshold,
  a second status when:
    each of the areas to be surveyed is within the field of view pattern to an extent exceeding a second threshold lower than the first threshold, and
    at least one of the areas to be surveyed is not within the field of view pattern to an extent exceeding the first threshold, and
  a third status when at least one of the areas to be surveyed is not within the field of view pattern to an extent exceeding the second threshold.

16. The system of claim 15, wherein the first threshold is 80% and the second threshold is 20%.

17. The system of claim 11, wherein the generating of the first estimated execution time for a periodic radar task of the plurality of radar periodic radar tasks comprises:
calculating a maximum range for each of a plurality of trapezoids to cover an area to be surveyed by the radar, the area to be surveyed corresponding to the periodic radar task, each of the plurality of trapezoids being defined by a cluster of radar beams, and
calculating a dwell time for each of a plurality of trapezoids, as a function of the maximum range and of a specified signal to noise ratio, and
summing the dwell times.

18. The system of claim 17, wherein the area to be surveyed has the shape of a polygon and wherein the calculating of a maximum range for a trapezoid of the plurality of trapezoids comprises:
for each beam in the cluster of beams defining the trapezoid:
  for each corner of the polygon:
    calculating the location of an intersection between:
      a line passing through the corner and an adjacent corner, and
      a radial line in the direction of the beam, and
    adding the distance of the point of intersection to a list of candidate maximum ranges when the point of intersection is on the polygon, and
taking the maximum value from the list of candidate maximum ranges.

* * * * *